Aug. 20, 1968   H. L. SACHS   3,398,285
SPECTRO-RADIOMETER WITH MEANS FOR ELIMINATING BACKGROUND NOISE
Filed Oct. 16, 1961   4 Sheets-Sheet 1

INVENTOR.
Harold L. Sachs 3,398,285
SPECTRO-RADIOMETER WITH MEANS FOR
ELIMINATING BACKGROUND NOISE
Harold L. Sachs, White Plains, N.Y., assignor to The
Perkin-Elmer Corporation, Norwalk, Conn., a corporation of New York
Filed Oct. 16, 1961, Ser. No. 145,299
8 Claims. (Cl. 250—217)

This invention relates to a spectro-radiometer, that is, a combined spectrophotometer and radiometer. The specific embodiment disclosed is capable of measuring the total radiation as well as the amount of radiation in each part of a spectral interval of a distant object such as the plume of a missile. In such measurements, the presence of strong background emissions from the surrounding sky constitute a type of noise which should be eliminated from the final measurement. In addition, the intensity of the measured radiation may vary by many magnitudes, so that the instrument should be capable of measuring intensities over a range of, say, 10,000 to 1. In addition, because of the rapid rate of change of this intensity with time, the device must also be able to make repeated measurements at different intensity levels in rapid sequence.

Broadly, the device comprises a radiometer section, a spectrophotometer section, and means for alternately presenting the radiation from the target to each of these sections. This time-sharing means may comprise a sectored rotating mirror chopper for alternately deflecting the incoming radiation to the radiometer section and allowing its passage through to the spectrophotometer section. In order to eliminate the effect of the background sky radiation, both sections are provided with means for measuring both the radiation from the background alone and from the target plus background, so that these two measurements may be subtracted to yield target only measurements. In the radiometer section the measurement of both background and target plus background radiation is accomplished by utilizing two detectors, one directly in the path of radiation from the target and the other slightly off this target radiation axis so as to receive only background radiation. The means for accomplishing this function in the spectrophotometer section differs in that a single detector is utilized; and a field switch in the form of a reticle chopper, having alternate openings which slightly differ in radial positions thereon so as to alternately allow target radiation and the adjacent background radiation therethrough, is positioned in front of the detector.

In order to allow the spectrophotometer section to measure radiation of a large intensity value range, an automatic gain control is utilized, the controlling signal for which is obtained from the previous spectral scan. For the purpose of providing a known amplitude reference signal, the radiometer detector is made to "see" a reference black body and another radiator at a constant radiation difference during the interval that the target radiation is intersected by the time-sharing mirrored chopper, while the spectrophotometer detector amplifier is provided with a known amplitude electrical pulse for this purpose. Additional structural and functional features include the use of a remotely actuated shutter for eliminating the background radiation path to the spectrophotometer detector when the target radiation subtends the full field of view, and the use of a re-entry ellipsoid-planar reflecting condenser system for the detectors of such construction that the target image is made smaller so that only a minute detector area is utilized, thereby improving the signal to noise ratio. Additionally, a clutch and brake assembly is provided for stopping the time-share mirrored chopper in a desired position so as to allow calibration of the spectrophotometer, as will appear later. Various synchronizing sensors are provided for determining the relationship between the various moving parts and for providing signals useful for separating the various cyclical signals at the output of the measurement channel. The illustrated embodiment is capable of recording these measurements in high fidelity fashion on conventional magnetic tape or, alternately, producing a visual output on an oscilloscope. Since both the radiometer and spectrophotometer channels are provided with a calibration pulse, the actual values of the output may be readily determined despite the fact that the gain of the system is changed by the automatic gain control.

An object of the invention is therefore the provision of an instrument which is capable of accurately measuring both total radiation and the spectral content of a radiant target.

Another object is the provision of a combined radiometer and spectrophotometer which may repeat both of these measurements in rapid sequence.

A further object is the provision of both a radiometer and spectrophotometer which can discriminate against the radiant energy in the vicinity of the desired target so as to eliminate this background effect.

A further object of the invention is the provision, in a radiometer, of a known calibration signal by means of sequentially presenting to the detector thereof radiation from two reference sources having a known temperature difference.

Another object of the invention is the provision of a spectrophotometer having automatic gain control and means for determining the actual value of the detected measurements despite the variable gain utilized.

A further object of the invention is the provision of both a radiometer and spectrophotometer having various features incorporated therein for increasing the signal to noise ratio, so as to make the instrument useful for measuring the radiation from a distant source and against a "noisy" background.

Another object of the invention is the provision of a combined radiometer and spectrophotometer capable of providing a signal suitable for high fidelity tape recording and utilizing synchronizing signals for retrieving the desired measurements from the tape.

Other objects and features of the invention will be obvious to one skilled in the art upon reading the following description of one exemplary embodiment of the invention and upon studying the accompanying drawing, in which.

Figures 1, 2:
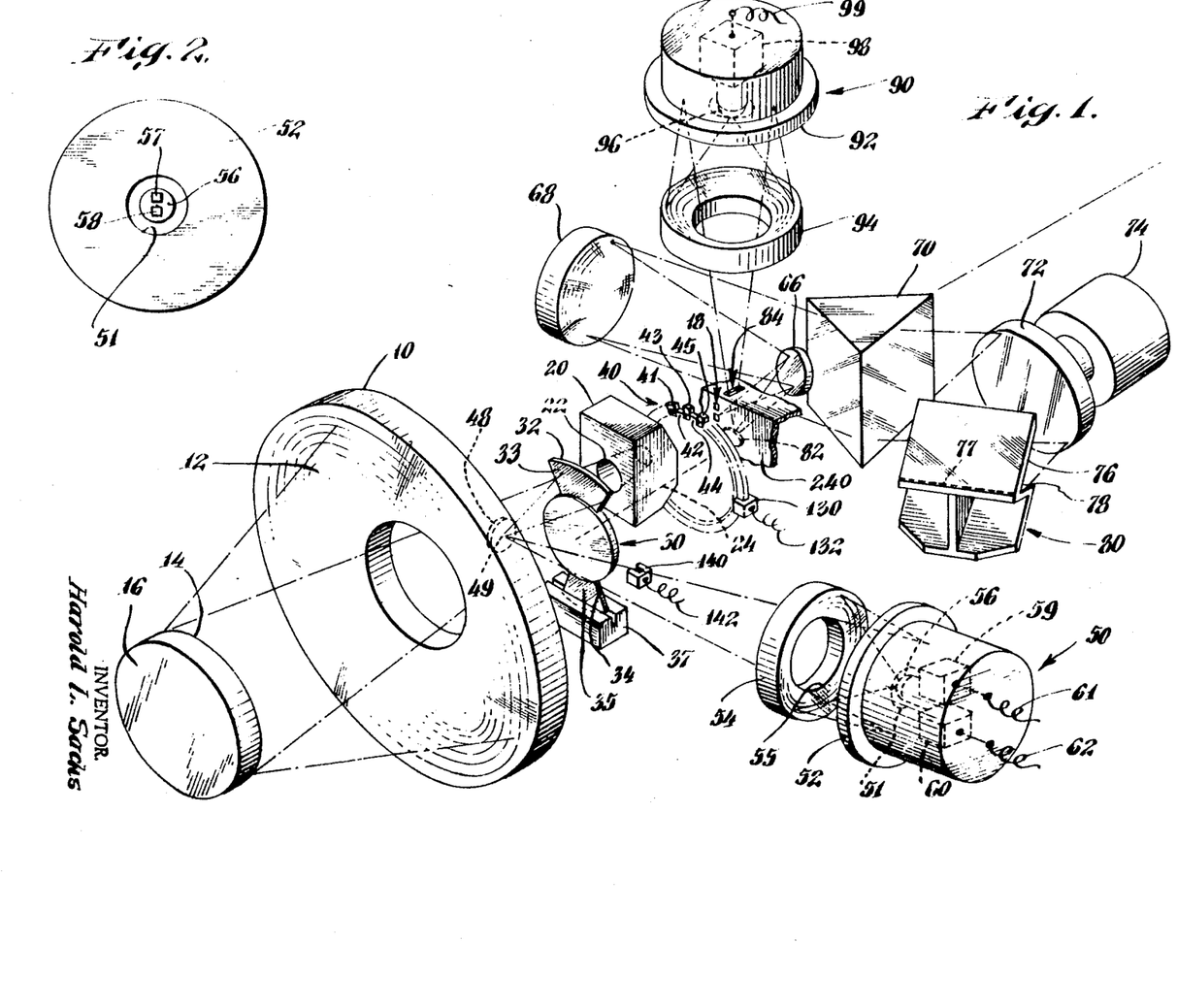
FIG. 1 is a schematic perspective of the general optical arrangement of the instrument.
FIG. 2 is a detail view of the radiometer detector, showing the two detector elements utilized therein.

In FIG. 1, substantially parallel light from a distant target and its near background will fall upon primary mirror 10 and be converged by its concave reflecting surface 12 so as to fall upon the adjacent convex reflecting surface 14 of spherical mirror 16, the two mirrors 10, 16 thereby forming a collecting and focusing system of the Dahl-KirKam type, which may be of approximately $f/2.4$ speed and have an effective focal length of about 36 inches. The light rays from the target and its near vicinity are therefore focused to form an image in the focal plane of elements 10 and 16 at aperture 18, forming the entrance slit for the spectrophotometric section, which is composed of the elements lying generally behind said slit. Before reaching the exit slit, however, the rays pass through a frusto-conical aperture 22 in black body 20, which aperture is slightly larger in diameter than the converging cone of the beam of rays. Additionally, the rays across the path of both the time-share chopper 30 and the reticle chopper 40, each of which is rotatably mounted about the same axis 24, which is parallel to the central ray of the beam. The time-share chopper comprises two different size sector blades, 32 and 34. The larger blade 32, which may be approximately a 60° sector, is mirrored both on the side 33 facing the incoming radiation and the opposite side; the smaller blade 34 is blackened on the side 35 facing the incoming radiation but is mirrored on the opposite face.

When blade 32 is intercepting the incoming radiation in the manner shown in FIG. 1, the rays will be reflected toward folding mirror 48, which is positioned near the image 49 of the target formed by this folded path, and is then reflected to the radiometer detector assembly, shown generally at 50. This assembly comprises a plane front surface mirror 52, having formed therein a small central aperture 51, which mirror reflects the diverging rays from the target image 49 toward ellipsoidal concave mirror 54 having a relatively large aperture 55 therein. The purpose of aperture 55 is, of course, to allow the diverging rays from the image 49 to reach the planar mirror 52, while the purpose of aperture 51 is to allow the rays, after passage from plane mirror 52 and ellipsoidal mirror 54, to reach the detector itself. The detector 56 in the radiometer section actually comprises two closely adjacent individual detector elements 57 and 58, as seen in FIG. 2. The output of each of these detector elements is separately amplified in an identical preamplifier 59, 60 (see FIG. 1) and is fed out therefrom by separate leads, 61, 62, which carry the amplified signals of detector elements 57 and 58, respectively. Detector 57 is placed directly on the optical axis of the rest of the system so that it receives the radiation from the target being measured plus some of the adjacent background radiation; detector 58 is, however, below the optical axis so that (since the target is centered on the optical axis during normal operation), it receives radiation only from the background in the vicinity of the target but none from the target itself. Therefore, lead 61 supplies a signal representing the target plus background radiation amplitude, and lead 62 supplies a background only signal. The use of an ellipsoidal planar condensing system of the type just described will produce a smaller target image at the detector 56 than was originally present at 49, thus allowing the use of extremely small area detector elements 57 and 58. Since the residual noise of detectors is proportional to their area, the use of small detectors improves the signal to noise ratio. Since the comparatively short focal length of the large aperture (high-speed) Dahl-KirKam system also produces a comparatively small target image at 49, the final image reaching the detector is extremely small. In a device actually built and corresponding to the illustrated embodiment, the field of view was a 2 minute square area, while each of the highly sensitive detector elements were only 0.15 mm. square. Actually, of course, two 2 minute square areas are sampled, one by each detector, the target lying wholly within the 2 minute square area "seen" by detector 57. Additionally, this construction allows the use of interchangeable plug-in detector (and preamplifier) units for different wave length range sensitivity.

When time share chopper 30 has turned, say, 60°, from the position shown in FIG. 1, the radiometer detectors 57 and 58 will both "see" the inside of black body 20. This black body is maintained at a slightly elevated temperature, say 12° C., above ambient temperature and the signal generated by the detectors when exposed to this level of radiation will correspond to the base level of the detector channels. When the smaller blade 34 (which may be a 15° sector) of the chopper 30 reaches the position intercepting the incoming radiation (i.e., in the position in which larger blade 32 is shown in FIG. 1), detector elements 57 and 58 will "see" the blackened face 35 of this blade. Since the chopper blades will rotate through a heat sink 37 which is at ambient temperature, blade 34 is maintained at ambient temperature also. Therefore, the movement of blade 34 into and out of the field of view of the detector elements 57 and 58 will cause a pulse to be generated thereby which is equal to the 12° C. differential in temperature seen by these detectors when blade 34 is present as opposed to that (of the black body) when no blade is present in this path. This differential radiation pulse, which is substantially invariable over a range of ambient temperature of 0° to 40° C. (the black body 20 being always 12° C. above), will appear in both radiometer detector outputs 61 and 62 and is utilized as a calibration pulse, as will hereinafter be described. In other words, referring to FIG. 4 the target plus background channel 61 will sequentially produce: (a) a target plus background radiation signal 100, when mirrored chopper blade 32 is present; (b) a black body or D.C. reference level signal 102, when no blade is present; (c) an ambient temperature vs. black body fixed radiation calibration pulse, 104, when small blackened blade 34 is present; and (d) a signal 106, like (b) again, between blades before repeating (a) again. The background channel 62 will produce similar signals except that the signal (a), when mirrored chopper blade 32 is in the beam will represent radiation only from the vicinity or background of the original target. Thus, again referring to FIG. 4, the signals generated will be (a), a background radiation signal 110; (b) a black body or reference level signal 112; (c) an ambient temperature vs. black body calibration pulse 114; and (d) a signal 116, similar to (b), representing the black body again. The rest of FIG. 4 will be described later.

When no blade of time-share chopper is present in the incoming beam of rays, the light will pass through the apertures 22 in the black body, through recticle chopper 40 (which will be subsequently described) to form an image of the target at entrance slit 18 of the spectrophotometer section of the instrument, and thus to enter this section as diverging rays. These rays are intercepted and reflected to the left by flat mirror 66 toward concave parabolic autocollimating mirror 68. Since slit 18 and the target image are at the focal point of this parabolic mirror, the rays reflected back by the paraboloid toward dispersing prism 70 will be parallel. In passing through prism 70, the rays will be dispersed or differentially refracted according to wave length, as is well known, the shorter wave lengths being refracted the most. The general path of these rays will then be as shown so as to strike nutating mirror 72. This mirror is mounted for rotation on nutating drive assembly 74 by being mounted thereon on an axis which is not perpendicular to the plane of mirror 72. Therefore, the mirror will nutate or wobble as its shaft mounting is rotated, thereby changing its angular relation to the dispersion prism in both the vertical and horizontal planes. The rays are then reflected to roof-angle mirror assembly 80, which comprises mirror surfaces 76 and 78 mutually at right angles to each other and generally facing the nutating mirror 72. The effect of such a right angle relationship between two mirrors is to return a reflected ray in a plane parallel to that plane which includes the originally incident ray and is parallel to the line of intersection of the mirrors. Thus, if the line of intersection of the mirrors is horizontal, as at line 77 in FIG. 1, a ray, after reflection by both of the mirror surfaces 76 and 78, will emerge in a plane making the same elevation angle with the horizon as did the plane containing the incident ray. In other words, the reflected ray and the incident ray will make the same elevational angle with the horizon, even though their azimuth angle will differ in general. The effect of the right angle prism is, therefore, to always return to the nutating mirror 72 rays that are the same in elevation as were the rays proceeding from the nutating mirror toward the roof-angle mirror. Therefore, these rays will be reflected by the nutating mirror back toward the dispersing prism in the same elevational plane as the ray occupied in going from the dispersing prism to the nutating mirror in the first place. Therefore, the overall effect of nutating mirror 72 and roof angle mirror 80 is similar to a mirror rotating about a vertical axis, since the combination compensates the effect of the motion of the nutating mirror about a horizontal axis. The reason for utilizing a nutating mirror rather than an oscillating mirror (pivoted about a vertical axis) is to allow rapid recycling of the mirror movement and therefore rapid scanning of the monochromator composed of collimator 68, dispersing prism 70, nutating mirror 72, and roof mirror 80, since oscillation at high speeds of a mirror is difficult to maintain without expenditure of large amounts of energy and severe accompanying vibration because of the great inertial loads.

The parallel dispersed rays in passing back through the prism 70 are dispersed further in the horizontal plane (i.e., the short wave length rays near the base of the prism and the long wave lengths nearer the apex) and are then focused by the collimator 68 so as to form, after a second reflection by flat mirror 66 and a reflection by small flat mirror 82, a spectrum image at the exit slit 84. The slight separation of the two paths of the incoming radiation through slit 18 and the outgoing radiation, so as to be therebelow and therefore strike mirror 82, is accomplished by a slight tilt of one of the reflecting elements, such as parabolic collimator 68 about a horizontal axis. The image of the spectrum at the exit slit will then be detected by spectrophotometer detector assembly 90, which comprises an apertured planar mirror 92 and an apertured ellipsoidal mirror 94, which correspond in structure and function to the similar elements, 52 and 54, of the radiometer detector, including ease of interchanging of detector elements and preamplifiers. The interchangeable detector element 96 in the spectrophotometer detector, however differs in that only a single element of rectangular form, having one side of twice the dimension of the other is used. The longer side is arranged so as to pick up the longer side of the exit slit 84. As in any spectrophotometer, the part of the spectrum which is present in the exit slit is the only part of the radiation "seen" by the detector at any given time so that nutation of mirror 72 will cause a scanning of the spectral image by moving it across the elongated slit 18 (i.e., in a direction perpendicular to its longer edge). Therefore, the spectrophotometer detector element 96 will feed to its preamplifier section 98 a signal which represents the intensity, at any given time, of a narrow spectral part of the wave lengths present in the incoming radiation, and which will represent the intensity of different spectral bands at different times. Such a signal is shown at the input in the FIG. 5 spectrophotometer electrical schematic at 120, which will be subsequently described. By mounting mirror 72 about its rotational axis in an adjustable manner so that its angle therewith may be varied, the wave length range of the spectrophotometer may be increased (greater angle) or decreased. By mounting the collimator 68, or roof mirror 80 for example, in an adjustable manner about a vertical axis, the part of the spectrum scanned (as measured by, say, its central ray wave length) may be adjusted.

The reason why the entrance slit 18 is shown as composed of two adjacent square areas and the function of the reticle or field switch chopper 40 will now be explained. This chopper is composed of two series of substantially square apertures, circumferentially arranged about the center thereof at two slightly different radial distances. More explicitly, an outer series of apertures may be formed by cutting away the outer edge of the chopper between blades 41, 43, 45, etc.; and an inner series of apertures may be formed by cutting away the material just radially inwardly of blades 41, 43, 45, etc. and circumferentially between inner blades 42, 44, etc. Although cutting away is described, actually any means which leaves "blades" 41–45 opaque while leaving the aforementioned "apertures" transparent may be employed, such as photoetching techniques or the like. Since approximately 120 apertures are preferably present in each circumferential series around the chopper, so that only a 3,675 r.p.m. chopper rotation rate (or 61¼ rotations per second) is required to yield an effective chopping rate of 7,350 times per second, photoetching techniques may be the only practical method of forming such a chopper. The reason for this rapid chopping will be subsequently described. The effect of this chopper is to alternately allow two slightly different fields of view of the target area to reach the entrance slit 18. In a manner similar to the radiometer section, one of these fields of view will contain the target (and a small surrounding area), while the other will contain only the radiation of an area slightly different (say, below) said target. Thus, the target radiation will appear in the, say, top half of the double height slit 18 and ⅟₇,₃₅₀ of a second later the background only radiation will appear at the lower half of slit 18. Therefore, the same alternate presentation at the double exit slit 84 will appear, first the target (plus adjacent background) in one half of the slit and then background only radiation, alternately, in the other half of the slit 84. The detector element 96, which is so shaped as to receive an image of both halves of slit 84 (as previously explained) will therefore alternately receive target plus adjacent background and then background only radiation at a 7,350 cycle per second alternating rate.

By providing an appropriate sensor 130 for detecting the alternation frequency of chopper 40, the target plus background signal and background only signals may be separated by well-known synchronous rectification techniques, using the output 132 of this sensor, as will be later described in connection with FIG. 5. A similar sensor 140 may be provided for detecting the presence of the different blades 32, 34 of the time share chopper 30, which chopper may be rotated at a lower rotation rate, say, 16.67 cycles per second (1,000 r.p.m.). The use of the output 142 of this sensor 140 will be subsequently described. The nutating mirror is driven to complete a nutation at a variable rate of say, 2.5 to 15 cycles per second (150 to 900 r.p.m.) and is supplied with two sensors as will be subsequently described in connection with FIG. 3. Since the nutation is equivalent to an oscillation about a vertical axis, actually two spectral scans will be performed for each complete nutation or rotation of mirror 72. This is caused by the fact that the mirror will go from a minimum to a maximum deviation angle and then back for each rotation of its non-perpendicular shaft. The spectrum will thus be scanned first in one direction (say, increasing wave length) as the mirror goes from one end point of deviation to the other and then in the other direction (say, decreasing wave length) as the mirror goes in the opposite direction. The spectrophotometer detector output will, therefore, produce a certain signal as the mirror 72 goes in one direction and a mirror image of this signal as the mirror nutates back to the starting point, as may be seen in the curve 120 in FIG. 5. This curve is shown as composed of the intensity of various spectral parts vs. wavelength and has been amplitude modulated by the reticle chopper switching frequency of 7,350 cycles per second.

Figure 3:
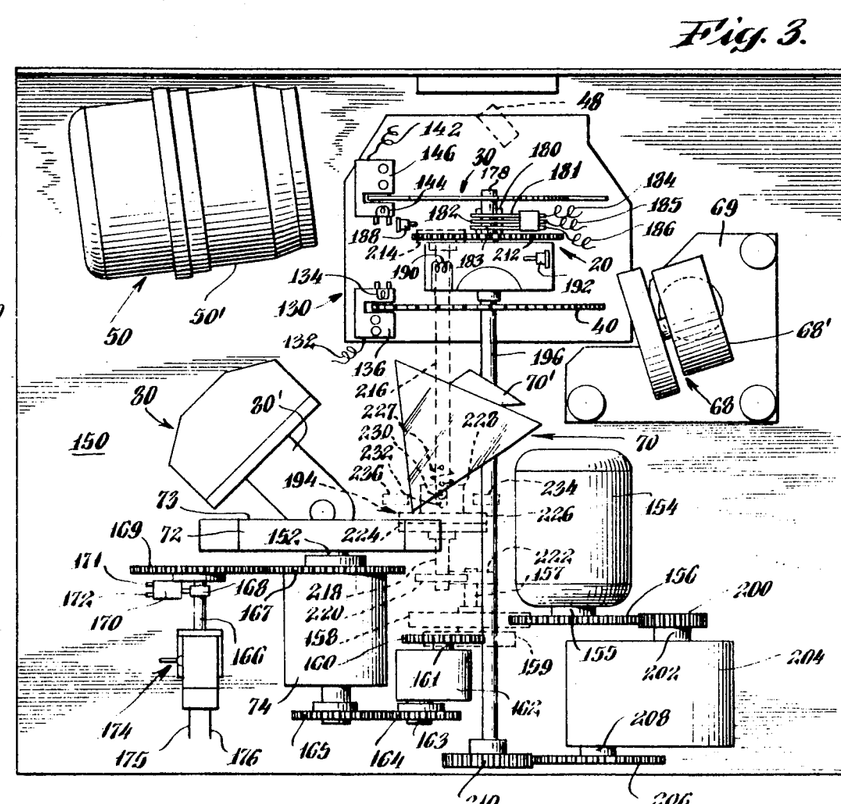
FIG. 3 is a plan view of the instrument with the main collector optics and the light shielding partitions omitted.

Before describing the overall operation of the device, some of the mechanical elements not shown in FIG. 1 will be first described in connection with FIG. 3. In this figure the same reference numerals are utilized for the elements shown in FIG. 1. The figure generally shows a plan view of one possible embodiment of the invention as seen from plane just below the spectrophotometer detector assembly 90 in FIG. 1 and further omits the collector optics 10–16. At the upper left hand corner of FIG. 3, the radiometer detector assembly 50 is shown housed in a conventional casing 50′. Below this assembly the roof mirror 80 is shown in its housing, which is connected by means of bracket 80′ to the base 150 of the instrument support. Similarly dispersing prism 70 is attached, as by bracket 70′ to the same base and collimator 68 held in mounting 68′, is attached by bracket 69. In each of these cases conventional means such as screws, rivets, bolts, or the like may be used as the attaching means. The nutating mirror 72 is shown as being mounted with its plane reflecting face 73 mounted at an angle slightly different from 90° on shaft 152, which is rotated in the nutator drive assembly 74 by means of a gear train from synchronous motor 154. This gear train may include a gear 156 mounted on motor shaft 155, which drives input gear 158 attached to intermediary shaft 157 so as to drive output gear 159, also rigidly mounted on shaft 157. Gear 159 drives gear 160 attached to input shaft 161 of nutator transmission 162, the output shaft 163 of which carries gear 164. This nutator transmission is capable of yielding a choice of, say, four gear ratios having a numeral relationship of, say, 1:2:4:6 so as to yield a choice of speeds yielding nutator rotation rates of, say, 2.5, 5, 10 and 15 cycles per second. Transmission output gear may then drive the nutating mirror by engaging gear 165 attached to the nutator mirror shaft 152. A synchronizing control shaft 166 is driven by a front gear 167 on the nutator drive shaft 152 through gear 169 on shaft 166. Shaft 166 carries a switching push button 168 which will close microswitch 170 upon each revolution of the nutator drive assembly. This microswitch has outputs 171 and 172 for supplying a signal indicating each complete revolution of the nutation mirror 72. Additionally shaft 166 has attached thereto the moving element, such as coils, of a synchronous resolver 174. This resolver has the property of generating a continuously variable signal, the amplitude of which will vary according to, say, the sine of the angle between the moving coils and a stationary electromagnetic pick up. Therefore, the output present at the resolver terminals 175 and 176 will be representative of the exact position of the nutating mirror 72.

The detector 140 for sensing the presence of the blades of time-share chopper 30 is shown as composed of a small light source 144 and a photo-sensitive element 146 positioned on opposite sides of the chopper blades, element 146 thereby providing synchronizing pulses over output lead 142. Similarly, the detector 130 for sensing the speed of rotation of the apertures in reticle chopper 40 may be composed of a small lamp 134 and photocell 136, providing an output at 132. In addition, the driving sleeve 178 of the time-share chopper is provided with a commutator 180 having separate electrically conducting segments for each of the blades 32, and 34 as well as for each of the openings therebetween. By this means electrically conducting brushes 181, 182, and 183 will complete different circuits depending on the position of the chopper. The outputs 184, 185 and 186 respectively from these brushes will therefore form different closed circuits according to the present position of the chopper blades. An ambient temperature sensor 188 is positioned adjacent the heat sink 37. The black body 20 is heated by means of the conventional heater 190 which is thermostatically controlled by black body temperature sensor 192. As previously explained, the function of these last three elements is to maintain the black body at a specific temperature differential from ambient (for example, 12° C. higher) by means of a control signal from a bridge network between the outputs of sensors 188 and 192.

A clutch and brake assembly 194 for disconnecting and stopping the time-share chopper so as to allow calibration measurements of the spectrophotometer section is controlled by a manual switch operating through the circuits completed by the outputs 184, 185, and 186 of the time-share chopper position sensor so as to cause stopping of the chopper with the large reflecting blade 32 in the light beam. In this position the spectrophotometer will receive reflected radiation from the interior of black body 20 which is at a known temperature so as to allow determination of the sensitivity of the spectrophotometer detector to various wavelengths. When so calibrating the spectrophotometer, the black body may be heated to an elevated temperature (for example, 500° K.) by means of heater 190 and a second setting on thermostat control 192. When only spectrophotometric measurements of the target are desired, the clutch-brake assembly, by being actuated through different brush 181, 182, or 183, may be made to stop the time-share chopper at a position with no blade intercepting the incoming radiation.

Before describing the operation and structure of the clutch brake assembly 194, the means for driving the two choppers will be explained. Reticle chopper 40 is rigidly mounted on shaft 196, which shaft also has rotatably mounted thereon the sleeve 178 to which the time-share chopper 30 is rigidly attached. Thus, the two choppers may rotate at different speeds and are in fact driven by two separate drives. Thus, chopper 40 and its shaft 196 are driven from motor gear 156 through input gear 200 mounted on the input shaft 202 of transmission 204. The output gear 206 mounted on output shaft 208 of this transmission drives gear 210 rigidly attached to one end of shaft 196. Transmission 204, besides supplying the correct rotation rate for the reticle chopper for normal use, namely, 3,675 r.p.m., also supplies a much slower gear ratio speed (e.g., 54 r.p.m.) which may be utilized when a detector having a slow response time (about 108 cycles per second), such as a thermistor is utilized as the spectrophotometer detector. The rotatable sleeve 178 and the time-share chopper 30 non-rotatably attached thereto are driven through gear 212 rigidly attached to the sleeve. Gear 212 is driven by small pinion 214 rigidly mounted on shaft 216, which is driven through clutch-brake assembly 194 by parallel shaft 218 which supports gear 220. This gear 220 is driven by gear 222 rigidly mounted on the upper end of intermediary shaft 157, which in turn is driven by the motor in a manner previously explained. It should be noted that in the illustrated embodiment changing of the speed of rotation of either the nutating mirror or the reticle chopper does not effect the rotation rate of time-share chopper 30. In fact, for reasons which will be explained hereinafter, the rate of rotation of the time-share chopper is purposely made to bear no small number ratio to the speeds of either the nutating mirror or reticle chopper.

The clutch-brake assembly 194 for disconnecting and stopping the time-share chopper may be composed of a clutch plate 224 rigidly attached to the upper end of parallel shaft 218 and a movable clutch plate 226 which is slideably mounted on shaft 216 by means of sleeve 228. This sleeve 228 and clutch plate 226 are held against rotation relative to the shaft 216 by means of pin 230 which passes through slot 232 in the sleeve and is rigidly fastened to shaft 216 and are urged in the direction of clutch plate 224 by a spring 227. Conventional means, such as a solenoid and yoke assembly (not shown), may be provided for sliding sleeve 228 and movable clutch plate 226 away from clutch plate 224 against the tension of spring 227, thereby disengaging shaft 218 from shaft 216. In addition to a clutch facing on the lower part of movable clutch plate 226, a brake facing is also supplied to its upper face. When the movable clutch plate 226 is retracted, this upper face will come in contact with a stationary braking surface, such as shown at 234 and 236, thereby stopping the time-share chopper 30 in a desired position. As previously explained, the clutch brake assembly is controlled by the circuits completed by the brushes 181, 182, and 183 and commutator 180 so that the time-share chopper will be stopped at the desired position. When a solenoid is utilized for actuating the clutch brake assembly, the outputs 184, 185, and 186 of the brushes would be in the various possible circuits through the coil of the solenoid.

Figure 3A:
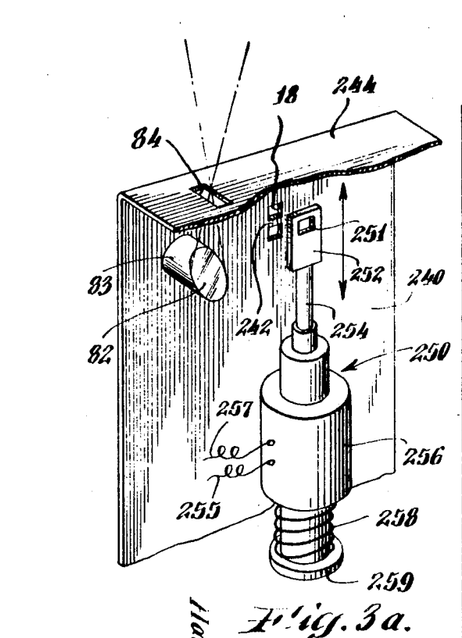
FIG. 3a is a fragmentary perspective detail showing part of the light shielding and the remotely actuated shutter means for eliminating the background radiation path at the entrance slit of the spectrophotometer.

Means for eliminating the background radiation in the path to the spectrophotometer detector and the associated structure is shown in FIG. 3a in conjunction with part of the shielding forming the entrance 18 and exit 84 slits of the spectrophotometer previously described. The FIG. 3a perspective view is generally taken from the back and from the right of the instrument as it is shown in FIG. 1. As shown in FIG. 3a, the double entrance slit may comprise two substantially adjacent identical square apertures in shielding partition 240, said apertures being separated by a narrow horizontal strip 242 of said partition which is not cut away. The exit slit 84 is shown as being a rectangular aperture cut in a horizontal portion 244 of said shielding partition 240. The means for supporting path-folding mirror 82 may comprise a cylindrical block 83 attached to partition 240 and having a face cut along a plane making an angle of approximately 45° to the vertical, for supporting mirror 82 at a like angle so as to deflect the beam of rays leaving the monochromator section upwardly through exit slit 84. The means for eliminating the background radiation comprises a solenoid-actuated shutter, shown generally at 250. Shutter blade 252 has a square aperture 251 therein which is substantially the same size as each of the apertures forming the double entrance slit 18. As shown in FIG. 3a, this shutter blade may be positioned so as to block the lower or background only square aperture of entrance slit 18, thereby allowing only the upper or target plus background radiation from the upper half of entrance slit 18 to pass through aperture 251 therein. The shutter blade is mounted on a shaft 254 which is urged in one direction (for example, downwardly) by spring 258 but may be drawn in the other direction by the energizing of electromagnetic coil 256 through electrical leads 255 and 257. By this means, shutter blade 252 may be positioned as shown so as to allow only target plus background radiation into the monochromator part of the spectrophotometer, or, alternatively, may be positioned in its downward position, so as to have all portions thereof completely below all of the entrance slit 18 and therefore allow all the radiation passing through said slit to enter the spectrophotometer section. This latter position corresponds to normal operation (background and then target plus background radiation alternately reaching the spectrophotometer section), while the up or obscuring position will allow only the target plus background radiation to reach the detector when no background only signal is required for subsequent subtraction to provide the effect of background radiation discrimination.

The device as described to this point operates as follows. Assuming that the operator wishes to use the instrument in its normal mode, that is, as a spectrophotometer and radiometer simultaneously, both the time-share chopper and the reticle chopper will be rotating. More specifically, the time-share chopper will be rotated by the motor through the various gearing and clutch brake assembly at a rate of 16⅔ cycles per second and the reticle chopper will be rotating at approximately 3,675 r.p.m., which yields, because of the 120 circumferentially arranged apertures, a chopping rate of 7,350 cycles per second. Because the radiation deflection mirror blade 32 of the time-share chopper is approximately 60° in extent, the radiometer will receive radiation approximately ⅙ of the time, while the spectrophotometer section will receive radiation ⅚ of the time. While the reflecting blade 32 is in the incoming beam of radiation, the radiometer detector elements 57 and 58 will "see" the target and background radiation respectively, as previously described.

Figure 4:
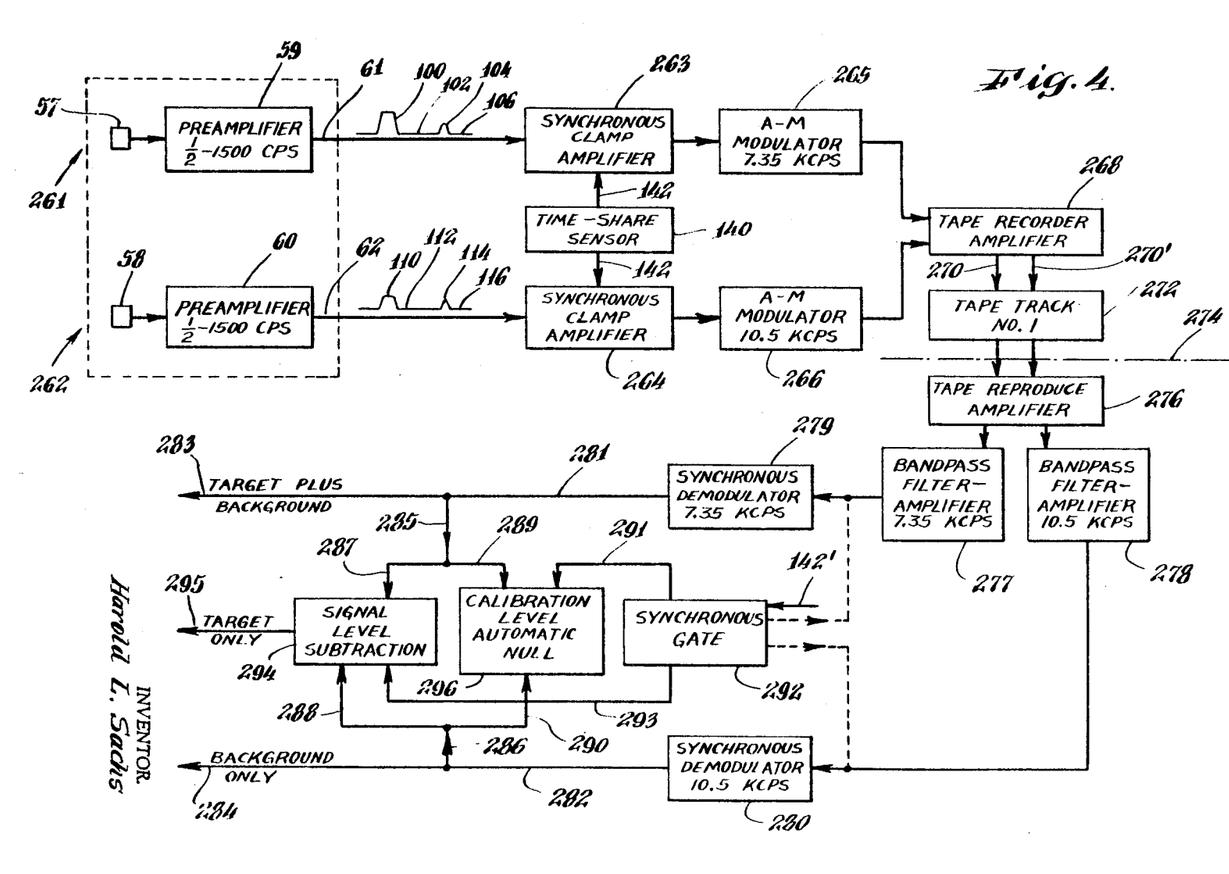
FIG. 4 is a schematic diagram of the radiometer signal-handling electronics.

These detectors will therefore produce pulses, such as shown at 100 and 110 in FIG. 4 during this interval. During this time the spectrophotometer detector 96 will be "seeing" by reflection from the back side of the chopper blade 32 the inside (i.e., aperture 22) of the black body 20 and would therefore produce a signal representative of the particular spectral band of this black body which the present position of nutating mirror 72 would present thereto. However, at this particular point of the spectrophotometer cycle, an electrical calibration pulse (see FIG. 5 at 123') is introduced into the measuring channel thereof as will be later described. As the time-share chopper rotates so that the opening between blades is present in the incoming radiation, the radiometer detector elements 57 and 58 will both produce a signal representative of the total radiation from the black body 20 as shown at 102 and 112 respectively in FIG. 4. During this time, the spectrophotometer detector will produce a signal representing the intensity of those spectral bands presented thereto by the varying position of the nutating mirror. Since this mirror completes a nutation from between 2½ to 15 times per second, only a part of the entire spectral image will be scanned between each of the openings in the time-share chopper 30. It should be noted that since the rate of rotation of the time-share chopper and the rate of nutation of mirror 72 do not have any small number ratio therebetween, different parts of the spectral scan cycles of the nutator will be interrupted by the two blades 32 and 34 of the chopper. Therefore, even though certain parts of the spectral scan will be missing from the signal produced by the spectrophotometer detector, nevertheless, a series of, say, two or three adjacent spectral scans will produce a complete measurement of the entire spectrum since different parts will be missing in each. During the spectrophotometer part of the time sharing, the reticle chopper 40 will, of course, be modulating light received by the detector thereof at a 7,350 cycle per second rate, as well as performing the alternate presentation of the target and background radiation thereto as previously explained. The resulting spectrophotometer detector signal will therefore be composed of a 7,350 cycle modulated signal representing the spectral scan of the target plus background, interlaced with a similarly modulated signal representative of the spectral scan of the background only. Because of the production of a 7,350 cycle synchronous signal from sensor 130, these two interlaced signals may be separated in the electronics section of the apparatus as will be subsequently described.

When the smaller blade 34 of the time-share chopper is present in the incoming radiation beam, both radiometer detectors 57 and 58 will produce a signal representative of the total radiation from this blade at ambient temperature as shown at 104 and 114 respectively in FIG. 4. Although these pulses are shown as being positive or above the black body radiation level (102 and 112), in the described embodiment these pulses would actually represent a lessening of the radiation level and would therefore normally fall below the background radiation level. The reason that the pulses are nevertheless shown above the background level is that rectification of the signal would produce the wave form shown in FIG. 4, regardless of the original direction of pulses 104 and 114. When this smaller blade 34 is in the beam of incoming radiation, the spectrophotometer detector will again "see" the interior of the black body 20 as shown by the narrow notch 124 in FIG. 5. It should be noted that the value of the spectral content at the particular scan interval of the black body does not produce a useful signal since the reticle chopper modulation rate will alternately present to the detector two substantially identical signals, since the effect of the reticle chopper in this instance is merely to alternate two substantially identical parts of the black body in the field of view of the detector. Because these 7,350 cycles per second interlaced signals are eventually separated, the value of these two signals should be identical whenever the detector "sees" the inside of the black body; therefore this signal, although useful for purposes of calibration, does not yield a desired measurment. When the next opening between the two chopper blades of the time share cropper is present in the incoming radiation, the spectrophotometer detector will be exposed to that part of the spectrum of the target and background slightly different from the part that it "saw" before the intervention of small blade 34; therefore, the spectral scanning will continue in much the same manner as previously described. As previously mentioned, the nutating mirror will eventually cause a scanning of the spectrum in both the increasing and decreasing wavelength directions. Since, as previously explained, the time share chopper frequency and this nutation of the mirror are asynchronous, the interruptions in the detector signal caused by the chopper will fall in a random relation in both the increasing wavelength and decreasing wavelength parts of this signal. Therefore, although the signal from a complete back and forth spectral scan caused by a complete nutation of the mirror 72 will produce a signal waveform in which the second half is a substantially exact mirror image of the first half (see FIG. 5), nevertheless, the interruptions (296', 124) in this wave caused by the two blades of the time-share chopper will generally not be symmetrically arranged about the center line 295', as shown in said FIG. 5.

The radiometer signal handling electronics are shown in FIG. 4. As previously explained and as shown in this figure, two separate channels 261 and 262 are utilized to maintain the signals from the target plus background and the background only radiation separate. The first of these channels comprises the previously described detector element 57 and its pre-amplifier 59 which produce at output 61 the target plus background signal which will comprise the previously described wave form shown at 100, 102, 104, and 106. This signal is fed into synchronous clamp amplifier 263 wherein the reference level signals (from the black body), namely, 102 and 106 are clamped to a zero level. In order to accomplish this synchronous clamping, the time-share synchronizing sensor 140 supplies through output 142 a synchronizing pulse to the clamp amplifier 263. By this means, the random noise in parts 102 and 106 of the signal may be eliminated. The output of amplifier 263 is then fed into A-M modulator 265 which will modulate the signal at a high frequency suitable for recording on a tape, for example, 7,350 cycles per second. The modulated signal is then fed to conventional tape recorder amplifier 268 which feeds the recording head, schematically represented by arrow 270 of a tape recorder so as to record this signal on one track of a four-track tape. This first track is schematically represented by the box 272 labeled "tape track No. 1" in FIG. 4. Before describing the play-back of this signal, which playback is schematically represented as occurring below dotted line 274, the recording of the background only radiation will first be described. This background only radiation is detected by element 58 which feeds pre-amplifier 60 so as to produce at the output 62 a signal comprising a wave form composed of pulses 110 and 114 on a reference level composed of parts 112 and 116. This signal is introduced into a synchronous clamp amplifier 264, similar to the corresponding amplifier used in the target plus background signal channel. As in the other channel the time-share sensor 140 supplies (by means of output 142) a synchronizing signal to amplifier 264. The output of this amplifier is then fed into A-M modulator 266 which modulates the background only signal at a different frequency than utilized for the target plus background channel. For example, where 7,350 cycles is utilized for the target plus background channel, a modulation frequency of 10,500 cycles per second may be utilized for the background only channel. The output of the modulator 266 is also fed to tape recorder amplifier 268 and is recorded on to the same first track of the tape by means of the same head (represented in this case by arrow 270'). For purposes of showing the fact that both signals are recorded on the same track, the outputs from the tape recorder amplifier 268 are shown as being separate and feeding two different tape recording heads, represented schematically by 270, 270', but actually the tape recorder amplifier does not maintain these two signals separate and only one recording head is required.

The retrieval of the information now stored on the first track of the tape is accomplished by a conventional tape playback or reproduction amplifier 276, which will feed a band pass filter network, schematically shown as two separate filters 277 and 278. Filter 277 will pass only the target plus background signal, since it is designed to pass only electrical signals substantially at a frequency of 7,350 cycles per second. Similarly, filter 278 will pass only the background only radiation at a frequency of 10,500 cycles. The output of filter 277 is then fed to synchronous demodulator 279 which will demodulate the 7,350 cycle per second carrier wave and produce at its output 281 a signal substantially identical to that originally produced by synchronously clamp amplifier 263. This signal may be utilized in this form at output 283 but is also fed as shown at 285, 287 and 289 into a signal level subtraction circuit 294 and a circuit 296 which is capable of nulling the calibration pulses 104 and 114 as will be described below. Meanwhile, the background only signal will enter synchronous demodulator 280 from filter 278. This synchronous demodulator will eliminate the 10,500 cycles per second modulation of the background only signal so that the signal present at 282 will be substantially identical to the original input signal at 62. This demodulated signal may then be utilized directly at main output 284 but is also fed by means of leads 286, 288 and 290 into the previously mentioned circuits 294 and 296. Synchronous gate 292 will control the operation of both circuits 294 and 296 as schematically shown at 291 and 293. Specifically the automatic nulling of the calibration level will be accomplished in circuit 296 by presenting thereto the calibration pulses 104 and 114 of the two signals and then varying the amplitude of one of these signals (say, the background only calibration pulse 114) until these signals are of the same amplitude. By this means any difference in the two channels caused by, for example, aging or differences in detectors, tubes, or transistors or the like will be counteracted since the original pulses 104 and 114 should have been originally identical in amplitude. The same change in amplitude which is required to make the calibration pulse 114 of the same magnitude as the calibration pulse 104 is also applied to the main radiation pulse 110 of the background channel. The effect of this variable amplitude multiplication is to normalize the radiation signals 110 and 100. In other words, by changing the amplitude of the entire background only signal, so that the calibration part thereof matches in magnitude the calibration part of the target plus background channel, the entire wave forms of both channels will have the same proportional relation as the original incoming signals do. Circuit 294 may then subtract the radiation pulses 100 and 110 of these normalized signals and supply at its output 295 a signal representing the difference. Therefore, the signal at this output will represent the intensity of the radiation from the target only.

Figure 5:
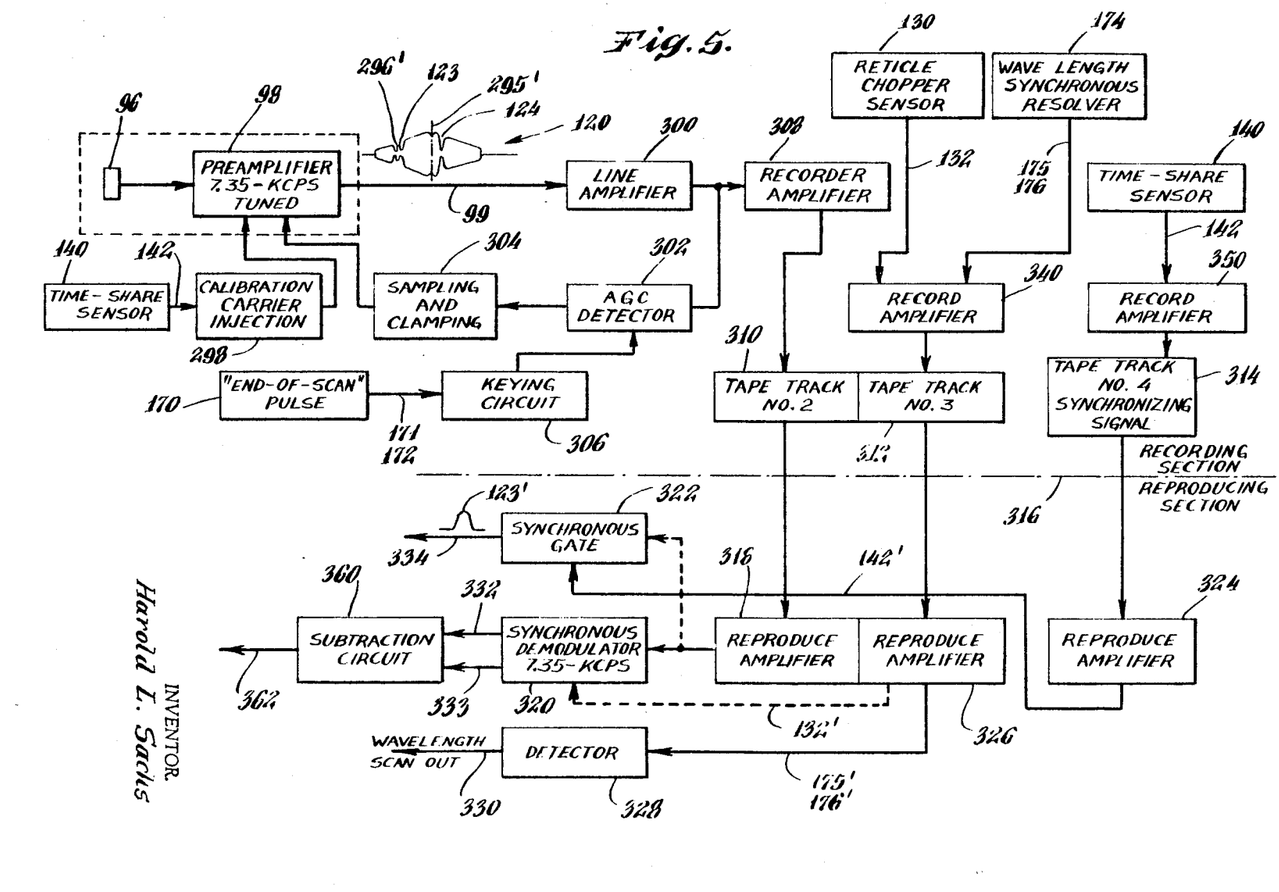
FIG. 5 is a schematic diagram of the spectrophotometer signal-handling electronics.

The spectrophotometer signal handling electronics are shown in FIG. 5. In this figure the spectrophotometer detector 96 introduces into pre-amplifier 98 a signal similar to that shown at pre-amplifier output 99. This signal will have an amplitude equal to the intensity of the target at any given narrow spectral band, modulated by the reticle chopper at 7,350 cycles per second, and, interlaced therewith, a similar representation of the intensity of the spectral intervals of the background only. In addition the signal will have notches shown at 296' and 124. The first notch 296' will be caused by the interruption of the radiation to the spectrophotometer detector by the larger blade 32 of the time-share chopper, while the smaller notch 124 is caused by smaller blade 34. During the time that the larger blade is in the incoming radiation, a calibration pulse 123 will be introduced into the pre-amplifier 98 by pulse injector 298. This pulse injection is controlled by the output 142 of the time-share sensor 140. The thus modified signal is then amplified by line amplifier 300, the output of which is monitored by the automatic gain control detection circuit 302. This AGC detector is connected to sampling and clamping circuit 304. The operation of circuits 304 and therefore 302 are controlled by a keying circuit 306 which in turn is controlled by the output 171, 172 of the end of scan pulse generator 170. The operation of circuits 302, 304, and 306 is such that the integrated or average amplitude of one wave form will control the amplification of the succeeding one. In other words, the AGC detector will determine the average amplitude of a wave like the one shown in FIG. 5 and will then apply through circuit 304 a pre-amplifier gain inversely proportional to the average amplitude of this signal when the following signal is amplified. The integration and supplying of such a signal may be carried out by conventional circuits, for example, using a capacitor as the storing and bias feeding means. It should be noted that since the calibration pulse 123 is fed into an early stage of the pre-amplifier, that this pulse will also be amplified by the same amount as the rest of the signal. The AGC controlled signal will then be fed to recorder amplifier 308 and onto the second track 310 of the tape. The other two tracks of the four-track tape may be utilized to carry the various synchronizing signals which are utilized in the playback circuits as will be described below. Thus tape track three, referenced 312, may be fed signals 132 from the reticle chopper sensor 130 and the wavelength synchronizing signal 175, 176 from the wave scan synchronous resolver 174. A conventional recorder amplifier 340 is, of course, utilized for this recording operation. The fourth track of the tape referenced 314 will be fed the time share synchronizing signal 142 from time-share sensor 140, a conventional recorder amplifier 350 also being utilized.

The play-back or reproducing part of the electronics are shown below dotted line 316. These comprise a reproduce amplifier 318 for track number 2 which will feed a synchronous demodulator 320 as well as a synchronous gate 322. The time-share synchronizing signal from track 4 will be processed by reproduce amplifier 324 so as to produce a signal 142' similar to the originally introduced signal 142. Signal 142' will then control the synchronous gate 322 (as well as the synchronous gate 292 of FIG. 4) so as to separate therefrom the calibration pulse 123' corresponding to the original pulse 123. The synchronous demodulator 320 will receive a 7,350 cycle per second signal 132' which is substantially identical to the originally introduced reticle chopper synchronizing signal 132. This signal 132' is, of course, derived from the third tape track reproduce amplifier 326. Additionally, reproduce amplifier 326 will supply the wave length synchronizing signal 175', 176' corresponding to the originally introduced synchronous resolver signal 175, 176. This last signal will be detected by detection circuit 328 and fed out at output 330. This signal may be utilized as the horizontal sweep for oscilloscope representation of the spectrophotometer wave form since the output at 330 represents the position of the nutating mirror 72, and therefore the particular wavelength being scanned at any given time. The main signal at outputs 332, 333 from the synchronous demodulator may form the vertical signal which is horizontally swept by the wavelength signal represented by output 330 on an oscilloscope so as to determine the intensity of the target radiation at any of the wavelengths scanned. The calibration signal at output 334 may be utilized in order to normalize the amplitude of the target radiation signal at 332.

The synchronous demodulator 320 may separate the interlaced signals representing the target plus background and target only signals so as to provide them at separate outputs 332 and 333, respectively. A conventional subtraction circuit 360 may then provide at its output 362 a signal representative of the difference of these signals, which will then be equal to the target only radiation at the various spectral ranges, in a manner similar to (but somewhat simpler) than that shown in FIG. 4 for the radiometer section. This signal 362 may be used as the vertical signal on an oscilloscope, which would be horizontally swept by the wave length scan output 330 so as to produce a wave form on the cathode ray tube thereof which will be a graphical representation of target intensity versus wave length. The gain on the vertical (target intensity) signal may be controlled in accordance with (inversely to) the magnitude of the pulse 123' at calibration output 334, so as to yield the same amplitude final signal for the same strength target radiation signal regardless of the setting of the automatic gain control (302, 304) at the time of the recording of the radiation signals.

The rapidly chopping reticle chopper 40, in addition to providing field switching and A-M modulation, also serves by the latter function to act as a discriminator against spurious signals caused by secondary emission from the instrument parts, any radiation leakage, or similar causes. Since only the 7,350 cycle modulated signal is ultimately transmitted to the outputs 332, 333 and finally 362, all the spurious signals which are not modulated by the recticle chopper will be filtered out before the output and will therefore not cause any appreciable source of noise in the overall system.

Since the description of the system above includes a description of the normal mode of operation, only a few words concerning the other modes of operation need be added. When the device is used as a spectrophotometer only, the manual electrical switch is positioned so as to connect the solenoid operating the clutch and brake assembly 224–234 in series with the one of the outputs 184, 185, 186 of the brushes 181, 182, 183 and commutator 180 which will energize the clutch and brake assembly to stop the time-share chopper with one of its two openings in the incoming radiant beam. In this position the spectrophotometer will receive all of the incoming radiation all the time and the radiometer detector will constantly receive radiation from the interior of the black body. In order to provide a regular timed calibration pulse (from injector 298) in this mode, an additional sensor (not shown) should be supplied, which may, for example sense the rotation of any of the constant running gears (such as 220, 222, 158, 159, 160, 156, or 200) or another gear driven therefrom. This sensor need not be at the same exact frequency as the time-share chopper (when it is running) since the same signal would also be used in place of the signals 142 and 142' in all parts of the spectrophotometer including the play-back in this mode of operation.

For calibration of the spectrophotometer, the manual switch is positioned so as to connect the appropriate one of the aforementioned brush outputs to stop the time-share chopper with, say, the larger blade 32 in the incoming radiation beam; at the same time (as by ganged switches) the thermostat control of the black body heater will be positioned so that the heater will warm the black body to a known temperature, say, 500° K. As in the previous case, the same additional sensor may supply the signal for the calibration pulse injector 298 and for the fourth tape track.

In any one of these modes, the solenoid shutter 250 may be energized so as to move the blade 252 thereof in partial obscuring relation (as shown in FIG. 3a) over the exit slit 18, thereby allowing radiation through only the upper or target plus background half of the slit. This energizing may be accomplished by a switch connecting the leads 255 and 257 of the solenoid coil 256 to a suitable source of current so as to electromagnetically attract the enlarged lower part of shaft 254 so as to move the shaft upwardly against the tension of coil spring 258 positioned between the lower part of coil 256 and a flange-like abutment 259 on the lower part of the shaft. When the shutter is so energized, no background only signal is produced in the spectrophotometer section so that the output 332 of the synchronous demodulator 320 may be used directly as the final output. This mode is normally used only on large (or near) targets where no background radiation is present in the so-called target plus background channel so that no background signal subtraction is required.

The speed of rotation of the nutating mirror 72 may be changed by adjusting multi-speed transmission 162, thereby changing the spectral scan rate of the nutator. This will give a choice of 2.5, 5, 10, or 15 spectral scans per second, as previously noted. When a thermistor or similarly slow-response detector is used as the spectrophotometer detector (the various detectors being easily interchangeable physically because of the constant image plane of the planar-ellipsoidal condenser systems), one of the slower scan rates must be used, and in addition, the recticle chopper speed will be reduced to a value such that its field-switching rate is no greater than the response time of the detector, for example, 108 cycles per second, as previously mentioned. This recticle chopper speed change is accomplished by utilizing the lower speed of two speed transmission 204.

Although a specific embodiment of the invention has been disclosed so as to conform to the patent statutes, the invention is not deemed to be limited to the specific details of the device disclosed. Obviously, any of the specific numerical data given (such as modulation frequency, time-share chopper rotation rate, detector size, and the like) are intended to be exemplary only even though they are illustrations of an embodiment actually built, the operation of which was highly satisfactory. Similarly, the specific details of the mechanical, electronic, and optical elements disclosed may be varied without departing from the spirit and scope of the present invention. Therefore, the invention is not limited to any of these specific details, but rather is defined by the scope of the applied claims.

I claim:

1. A radiometer comprising means for collecting radiation from a target; a first reference radiator; a second reference radiator; means for maintaining a known differential between the temperature of said first and said second reference radiators; a radiation sensitive detector capable of generating a signal which is a function of the intensity of the radiation falling thereon; and high speed alternating means for automatically sequentially directing onto said detector during three distinct time intervals, in some sequential order, collected radiation from said target, radiation from said first reference radiator, and radiation from said second reference radiator, said radiation sensitive detector thereby producing at least a first detector signal which is a function of the difference between the radiation intensity of said target and the radiation intensity of one of said reference radiators and a second detector signal which is the same function of the difference in the radiation intensities of said first and second reference radiators, caused by said known temperature differential.

2. A radiometer according to claim 1, in which said alternating means comprises a rotating chopper, said chopper comprising at least one reflecting blade, at least one opening, and at least one blackened blade acting as a radiant reference source; said chopper being so positioned relative to said detector that said detector will be exposed sequentially to radiation reflected from said reflecting blade, radiation passing through said opening, and radiation from said blackened blade; said blackened blade thereby acting as one of said reference radiators.

3. A radiometer comprising means for collecting radiation from an area including a target and from a similar sized background area adjacent said target; a first reference radiator; a second reference radiator; means for maintaining a known temperature differential between said first and said second reference radiators; a pair of closely adjacent similar detector elements, each capable of generating a signal which is a similar function of the intensity of the radiation falling thereon; alternating means for sequentially directing onto one of said detector elements substantially all of said collected radiation from said target area, and, at the same time, substantially all of the collected radiation from said background area onto said other of said detector elements, radiation from said first reference radiator onto both of said detector elements, and radiation from said second reference radiator onto both of said detector elements; said one detector element thereby producing at least a first signal which is a function of the difference between the radiation intensity of said target area and the radiation intensity of one of said reference radiators and a second signal which is the same function of the difference in the radiation intensities of said first and second reference radiators caused by said known temperature differential; said other detector element thereby producing at least a first signal which is a function of the difference between the radiation intensity of said background area and the radiation intensity of one of said reference radiators and a second signal which is the same function of the difference in the radiation intensities of said first and second reference radiators caused by said known temperature differential; said second signals of each of the detector elements being therefore equal and serving as a calibration signal.

4. A radiometer comprising means for collecting radiation from an area including a target and from a similar sized background area adjacent said target; a first reference radiator; a second reference radiator; means for maintaining a known temperature differential between said first and said second reference radiators; a pair of closely adjacent similar detector elements, each capable of generating a signal which is a similar function of the intensity of the radiation falling thereon; alternating means for sequentially directing onto one of said detector elements substantially all of said collected radiation from said target area, and, at the same time, substantially all of the collected radiation from said background area onto said other of said detector elements, radiation from said first reference radiator onto both of said detector elements, and radiation from said second reference radiator onto both of said detector elements; said one detector element thereby producing at least a first signal which is a function of the difference between the radiation intensity of said target area and the radiation intensity of one of said reference radiators and a second signal which is the same function of the difference in the radiation intensities of said first and second reference radiators caused by said known temperature differential; said other detector element thereby producing at least a first signal which is a function of the difference between the radiation intensity of said background area and the radiation intensity of one of said reference radiators and a second signal which is the same function of the difference in the radiation intensities of said first and second reference radiators caused by said known temperature differential; and means for producing a resulting signal equal to the difference between said first signals, said resulting signal thereby being a function of the radiation intensity from said target only.

5. A radiometer comprising means for collecting radiation from an area including a target and from a similar sized background area adjacent said target; a first reference radiator; a second reference radiator; means for maintaining a known temperature differential between said first and said second reference radiators; a pair of closely adjacent similar detector elements, each capable of generating a signal which is a similar function of the intensity of the radiation falling thereon; alternating means for sequentially directing onto one of said detector elements substantially all of said collected radiation from said target area, and, at the same time, substantially all of the collected radiation from said background area onto said other of said detector elements, radiation from said first reference radiator onto both of said detector elements, and radiation from said second reference radiator onto both of said detector elements; said one detector element thereby producing at least a first signal which is a function of the difference between the radiation intensity of said target area and the radiation intensity of one of said reference radiators and a second signal which is the same function of the difference in the radiation intensities of said first and second reference radiators caused by said known temperature differential; said other detector element thereby producing at least a first signal which is a function of the difference between the radiation intensity of said background area and the radiation intensity of one of said reference radiators and a second signal which is the same function of the difference in the radiation intensities of said first and second reference radiators caused by said known temperature differential; means for adjusting the amplitude of one of said second signals to make it equal to the other of said signals; means for adjusting the amplitude of the first signal from the same detector element as said adjusted second signal in the same manner; and means for producing a resulting signal equal to the difference between said first signals after said adjustment, said resulting signal being a function of the radiation intensity from said target only.

6. A combined spectrophotometer and radiometer comprising means for collecting radiation from a target so as to present it along an optical axis; a reference source of radiation positioned near said optical axis; a radiometer detector comprising means for determining the total intensity of said radiation; a spectrophotometer detection section comprising means for determining the spectral intensity distribution of said radiation; and chopper means for sequentially presenting to said radiometer detector and said spectrophotometer detection section the collected radiation along said optical axis; said reference source and said radiometer detector being so positioned, and said chopper means being of such construction and at such position that said spectrophotometer detection section will receive radiation from said reference source when said collected radiation is presented to said radiometer detector and said radiometer detector will receive radiation from said reference source when said collected radiation is presented to said spectrophotometer detection section.

7. A combined spectrophotometer and radiometer according to claim 6 in which said chopper means further comprises means for sequentially presenting to said radiometer detector a second reference source of radiation.

8. An instrument for measuring radiation comprising means for collecting radiation from an area including a target and from a similar sized background area adjacent said target; a detector element of such size and position as to be capable of receiving radiation from both said target area and said background area; means sequentially for first interrupting the radiation from said target area which would otherwise reach said detector while allowing passage of the radiation from said background area to said detector, and for then interrupting the radiation from said background area which would otherwise reach said detector while allowing passage of the radiation from said target area to said detector; additional means, movable between two positions, for completely blocking in a first position the radiation from said background area, which would otherwise reach said detector so as to continually present to said detector radiation from said target area modulated by said means for sequentially interrupting said radiation; said additional means being movable out of said completely blocking first position into a second position, so as to allow radiation from said background area to reach said detector in alternate relation to the reaching thereof by said target area radiation and means for optionally moving said additional means between said first blocking position and said second position.

References Cited
UNITED STATES PATENTS

| | | | |
|---|---|---|---|
| 2,219,775 | 10/1940 | Harrison | 88—22.5 |
| 2,474,098 | 6/1949 | Dimmick | 250—230 X |
| 2,674,700 | 4/1954 | Small | 250—216 |
| 2,702,494 | 2/1955 | Lieneweg et al. | 88—22.5 |
| 2,817,769 | 12/1957 | Siegler et al. | 250—220 |
| 2,483,008 | 7/1958 | Montet | 88—22.5 |
| 2,948,185 | 8/1960 | Ward et al. | 88—14 |
| 2,952,781 | 9/1960 | Hersh | 250—216 |
| 2,961,545 | 11/1960 | Astheimer et al. | 250—203 |
| 3,010,024 | 11/1961 | Barnett et al. | 250—203 |
| 3,011,389 | 12/1961 | Siegler | 88—14 |
| 3,012,473 | 12/1961 | Astheimer et al. | 250—233 X |
| 3,025,023 | 3/1962 | Burghausen | 250—203 X |
| 3,035,175 | 5/1962 | Christensen | 250—83.3 |
| 3,039,006 | 6/1962 | Weiss | 250—233 |
| 3,143,588 | 8/1964 | Donald et al. | 250—203 X |

WALTER STOLWEIN, *Primary Examiner.*